US010759020B2

(12) United States Patent
Nakamura

(10) Patent No.: US 10,759,020 B2
(45) Date of Patent: Sep. 1, 2020

(54) CALIBRATION METHOD FOR EDDY CURRENT SENSOR

(71) Applicant: EBARA CORPORATION, Tokyo (JP)

(72) Inventor: Akira Nakamura, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 340 days.

(21) Appl. No.: 15/961,741

(22) Filed: Apr. 24, 2018

(65) Prior Publication Data
US 2018/0311788 A1 Nov. 1, 2018

(30) Foreign Application Priority Data

Apr. 26, 2017 (JP) .................................. 2017-087080

(51) Int. Cl.
B24B 49/10 (2006.01)
B24B 49/02 (2006.01)
B24B 37/013 (2012.01)
G01B 7/06 (2006.01)
G01B 21/04 (2006.01)

(52) U.S. Cl.
CPC .......... B24B 49/105 (2013.01); B24B 37/013 (2013.01); B24B 49/02 (2013.01); G01B 7/105 (2013.01); G01B 7/107 (2013.01); G01B 21/042 (2013.01)

(58) Field of Classification Search
CPC ....... B24B 49/105; B24B 7/013; B24B 49/02; G01B 7/105; G01B 7/107; G01B 21/042
USPC ..................................... 451/5, 41, 285–290
See application file for complete search history.

(56) References Cited

U.S. PATENT DOCUMENTS

| 7,189,140 | B1* | 3/2007 | Shugrue | B24B 49/105 |
| | | | | 451/5 |
| 7,198,545 | B1* | 4/2007 | Korovina | B24B 37/005 |
| | | | | 324/229 |
| 7,403,001 | B1* | 7/2008 | Bailey, III | G01B 7/105 |
| | | | | 324/222 |
| 9,636,797 | B2* | 5/2017 | Xu | B24B 49/04 |
| 10,569,380 | B2* | 2/2020 | Nakamura | H01L 22/26 |
| 2007/0001670 | A1* | 1/2007 | Bailey, III | G01B 7/105 |
| | | | | 324/230 |
| 2007/0103150 | A1* | 5/2007 | Tada | G01B 7/105 |
| | | | | 324/229 |
| 2007/0205765 | A1* | 9/2007 | Bailey, III | G01B 7/105 |
| | | | | 324/230 |

(Continued)

FOREIGN PATENT DOCUMENTS

JP 2007-263981 A 10/2007

Primary Examiner — George B Nguyen
(74) Attorney, Agent, or Firm — BakerHostetler

(57) ABSTRACT

In a first step, an output of an eddy current sensor is measured while a polishing target whose film thickness has been known is in contact with the polishing face, thereby obtaining a measurement value of the eddy current sensor which corresponds to the film thickness. In a second step, an output of the eddy current sensor is measured when the polishing target is polished while pressed against the polishing face, thereby obtaining a measurement value of the eddy current sensor that corresponds to a film thickness during polishing. A correspondence relationship between the film thickness of the polishing target and the measurement value of the eddy current sensor is determined from the measurement value obtained in the first step and the measurement value obtained in the second step.

9 Claims, 11 Drawing Sheets

(56) References Cited

U.S. PATENT DOCUMENTS

| | | | |
|---|---|---|---|
| 2008/0139087 A1* | 6/2008 | Togawa | B24B 49/105 451/8 |
| 2009/0104847 A1* | 4/2009 | Kobayashi | B24B 37/042 451/5 |
| 2009/0149115 A1* | 6/2009 | Palou-Rivera | B24B 37/042 451/5 |
| 2009/0286332 A1* | 11/2009 | Ohta | H01L 22/26 438/7 |
| 2013/0065493 A1* | 3/2013 | Takahashi | B24B 37/013 451/59 |
| 2015/0118766 A1* | 4/2015 | Xu | H01L 22/26 438/10 |
| 2015/0224623 A1* | 8/2015 | Xu | B24B 49/04 451/5 |
| 2015/0262893 A1* | 9/2015 | Nakamura | B24B 37/013 438/10 |
| 2018/0016676 A1* | 1/2018 | Nakamura | B24B 49/04 |
| 2019/0131150 A1* | 5/2019 | Suzuki | H01L 21/68728 |
| 2019/0299356 A1* | 10/2019 | Xu | G06N 20/00 |

* cited by examiner

CALIBRATION METHOD FOR EDDY CURRENT SENSOR

CROSS-REFERENCE TO RELATED APPLICATION

This application is based upon and claims benefit of priority from Japanese Patent Application No. 2017-087080 filed on Apr. 26, 2017, the entire contents of which are incorporated herein by reference.

TECHNICAL FIELD

The present invention relates to a calibration method for an eddy current sensor.

BACKGROUND ART

In connection with enhanced integration and increased density of semiconductor devices, wires of circuits have recently become finer and finer, and the number of layers of multilayer interconnections has also increased. In order to realize multilayer interconnection while micronizing a circuit, it is necessary to precisely perform planarization processing on the surface of a semiconductor device.

CMP (Chemical Mechanical Polishing) is known as a technique of planarizing the surface of a semiconductor device. A polishing apparatus for performing CMP includes a polishing table to which a polishing pad is stuck, and a top ring for holding a polishing target (for example, a substrate such as a semiconductor wafer, or each kind of film formed on the surface of a substrate). The polishing apparatus polishes the polishing target by pressing the polishing target held by the top ring against the polishing pad while rotating the polishing table.

The polishing apparatus includes a film thickness measuring device to detect an endpoint of a polishing step based on the film thickness of a polishing target. The film thickness measuring device has a film thickness sensor for detecting the film thickness of the polishing target. An eddy current sensor is known as a representative of the film thickness sensor.

The eddy current sensor is disposed in a hole formed in a polishing table, and detects the film thickness of the polishing target when it faces the polishing target while rotated along with the polishing table. The eddy current sensor causes the polishing target such as a conductive film to induce eddy current therein, and detects variation of the thickness of the polishing target from variation of magnetic field occurring due to the eddy current induced in the polishing target. In order to use the eddy current sensor as a film thickness sensor, a calibration for obtaining a correspondence relationship between the film thickness and the measurement value of the eddy current sensor is necessary before an actual measurement is started.

The conventional calibration has been performed as follows. When the eddy current sensor is mounted in the polishing apparatus, a polishing pad is interposed between the conductive film as the polishing target and the eddy current sensor. When the thickness of the polishing pad varies, the output of the sensor also varies. In a prior art described in JP2007-263981A, the calibration is performed by using plural polishing pads having different pad thicknesses and plural calibration wafers having different film thicknesses. Since different pad thicknesses and different film thicknesses are combined with one another, measurement is performed a number of times to obtain a correspondence relationship between the film thickness of the polishing target and the measurement value of the eddy current.

The prior art has also the following problems. First, since the plural polishing pads for calibration are disposed on the polishing table, it is necessary to peel off a polishing pad which has already been stuck to the polishing table. Accordingly, one polishing pad must be discarded for the calibration, resulting in increase of the cost. Secondly, since a calibration wafer is manually placed on the polishing pad, there is a problem that the positional precision is low. Additionally, an error may occur, since dust or the like is attached to the polishing pad or the calibration wafer due to manual operation. Thirdly, since the calibration wafer is repetitively used, oxidation or the like occurs, so that deterioration of the calibration wafer may cause an error.

CITATION LIST

Patent Literature

PTL 1: JP2007-263981A

SUMMARY OF THE INVENTION

Technical Problem

A mode of the present invention has been implemented to dissolve the problem as described above, and has an object to provide a calibration method for an eddy current sensor that is capable of performing a calibration without peeling off a polishing pad.

Solution to Problem

In order to solve the foregoing problem, a first aspect adopts a configuration of a calibration method for an eddy current sensor for determining a correspondence relationship between a film thickness of a polishing target and a measurement value of the eddy current sensor to measure the film thickness of the polishing target by the eddy current sensor when the polishing target is polished while pressed against a polishing face, comprising: a first step of measuring an output of the eddy current sensor while the polishing target whose film thickness has been known is in contact with the polishing face, thereby obtaining a measurement value of the eddy current sensor which corresponds to the film thickness; and a second step of measuring an output of the eddy current sensor when the polishing target is polished while pressed against the polishing face, thereby obtaining a measurement value of the eddy current sensor that corresponds to a film thickness during polishing, wherein the correspondence relationship between the film thickness of the polishing target and the measurement value of the eddy current sensor is determined from the measurement value obtained in the first step and the measurement value obtained in the second step.

In this embodiment, no calibration wafer is used. A polishing target (for example, wafer) which is an actual product whose film thickness has been known can be used. Plural polishing pads having different pad thicknesses are unnecessary, and plural calibration wafers having different film thicknesses are unnecessary. It is not necessary to peel off a polishing pad which has already been struck to a rotating table. A calibration can be performed by using a polishing pad which has already been struck to the rotating table.

The film thickness of the polishing target means the film thickness of a film formed on the surface of the polishing target. When plural films are formed on the surface of the polishing target, the film thickness means the film thickness of a film which is located at the outermost portion and is to be polished. The measurement value of the eddy current sensor indicates a signal or data which is directly or indirectly obtained from the output of the eddy current sensor.

A second aspect adopts a configuration of a calibration method in which the second step is performed by using the polishing target used in the first step.

A third aspect adopts a configuration of a calibration method in which the polishing target used in the first step and the polishing target used in the second step are different from and independent of each other.

A fourth aspect adopts a configuration of a calibration method further comprising a step of measuring an output of the eddy current sensor while the eddy current sensor is moved from one end of the polishing target to another end of the polishing target on the polishing target, and a step of determining a rate of change of an obtained measurement value at each point on the polishing target, detecting positions of the one end and the other end of the polishing target from the rates of change, and determining a center position of the polishing target from the detected positions of the one end and the other end.

A fifth aspect adopts a configuration of a calibration method further comprising a third step of measuring an output of the eddy current sensor at least two points on a route from one end of the polishing target toward another end of the polishing target while the eddy current sensor is moved along the route, setting the measurement value at a predetermined position on the route as a reference value, and obtaining information on a first difference between the measurement value at each position on the route and the reference value, and a fourth step of determining, based on the information, a second difference between the measurement value obtained in the first and second steps and the difference at a position on the route which corresponds to each point at which the first measurement value is obtained.

A sixth aspect adopts a configuration of a calibration method further comprising a third step of measuring an output of the eddy current sensor at at least one point on a route from one end of the polishing target toward another end of the polishing target while the eddy current sensor is moved along the route when polishing of the polishing target is finished, and obtaining information on a measurement value at each position on the route when the polishing of the polishing target is finished, and a fourth step of determining, based on the information, a difference between the measurement value obtained in the first and second steps and the measurement value when the polishing is finished at a position on the route which corresponds to each point at which the measurement value is obtained.

A seventh aspect adopts a configuration of a calibration method for an eddy current sensor for determining a center position of a polishing target to measure a film thickness of the polishing target by the eddy current sensor when the polishing target is polished while pressed against a polishing face, comprising: a step of measuring an output of the eddy current sensor when the eddy current sensor is moved from one end of the polishing target to another end thereof on the polishing target; and a step of determining a rate of change of an obtained measurement value at each point on the polishing target, detecting positions of the one end and the other end of the polishing target from the rates of change, and determining a center position of the polishing target from the detected positions of the one end and the other end.

An eighth aspect adopts a configuration of a calibration method for an eddy current sensor for determining a variation of a measurement value on a route from one end of a polishing target toward another end thereof, the variation occurring when an eddy current sensor is moved along the route, to measure a film thickness of the polishing target by the eddy current sensor when the polishing target is polished while pressed against a polishing face, comprising: measuring an output of the eddy current sensor at least two points on a route from one end of the polishing target toward another end of the polishing target while the eddy current sensor is moved along the route, setting the measurement value at a predetermined position on the route as a reference value, and obtaining information on a first difference between the measurement value at each position on the route and the reference value, and determining, based on the information, a second difference between a measurement value obtained by the eddy current sensor in an actual measurement after a calibration is finished, and the first difference at a position on the route which corresponds to each point at which the measurement value is obtained.

A ninth aspect adopts a configuration of a calibration method for an eddy current sensor that takes account of a measurement value of the eddy current sensor under a state that polishing of a polishing target is finished in order to measure a film thickness of the polishing target by the eddy current sensor when the polishing target is polished while pressed against the polishing face, comprising: measuring an output of the eddy current sensor at at least one point on a route from one end of the polishing target toward another end of the polishing target while the eddy current sensor is moved along the route when the polishing of the polishing target is finished, and obtaining information on the measurement value at each position on the route when the polishing of the polishing target is finished; and determining, based on the information, a difference between a measurement value obtained by the eddy current sensor in an actual measurement after a calibration is finished, and the measurement value when the polishing is finished at a position on the route which corresponds to each point at which the measurement value is obtained.

DESCRIPTION OF EMBODIMENTS

Embodiments according to the present invention will be described with reference to the drawings. In the following embodiments, the same or corresponding members are represented by the same signs, and duplicative descriptions thereof are omitted.

Figure 1:
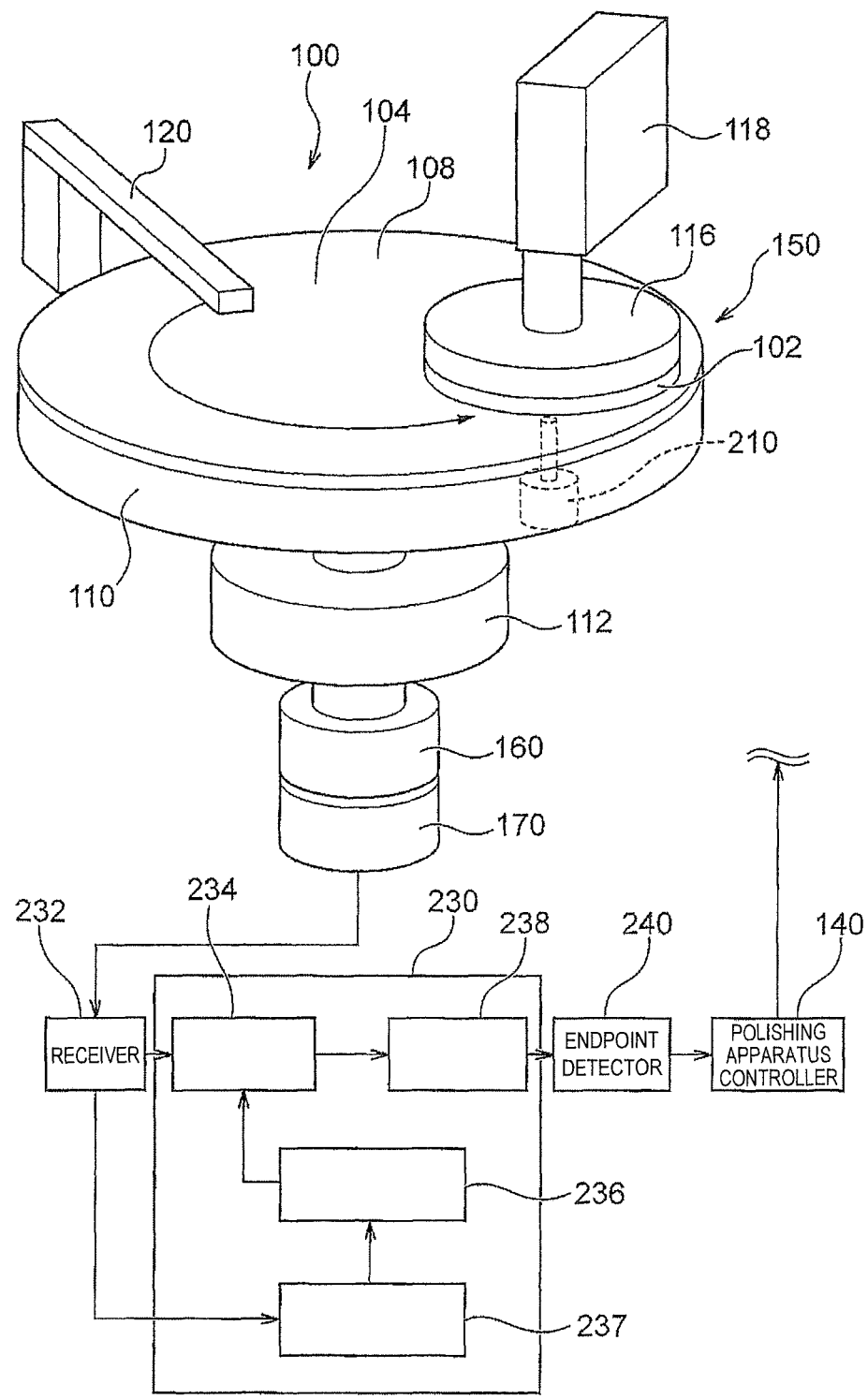
FIG. 1 is a schematic diagram showing the overall configuration of a polishing apparatus.

FIG. 1 is a schematic diagram showing the overall configuration of a polishing apparatus according to an embodiment of the present invention. As shown in FIG. 1, a polishing apparatus 100 includes a polishing unit 150 for polishing a polishing target (for example, a substrate such as a semiconductor wafer, or each kind of film formed on the surface of the substrate) 102. The polishing unit 150 includes a polishing table 110 having an upper surface on which a polishing pad 108 for polishing the polishing target 102 can be fitted, a first electric motor 112 for rotating the polishing table 110, a top ring 116 capable of holding the polishing target 102 and a second electric motor 118 for rotating the top ring 116.

The polishing unit 150 includes a slurry line 120 for supplying abrasive liquid containing a polishing material onto the upper surface of the polishing pad 108. The polishing apparatus 100 includes a polishing apparatus controller 140 for outputting various kinds of control signals related to the polishing unit 150.

The polishing apparatus 100 includes an eddy current sensor 210 that is disposed in a hole formed in the polishing table 110 and detects the film thickness of the polishing target 102 along a polishing face with the rotation of the polishing table 110.

When polishing the polishing target 102, the polishing apparatus 100 supplies polishing slurry containing abrasive grains from the slurry line 120 to the upper surface of the polishing pad 108, and rotates the polishing table 110 by the first electric motor 112. Then, the polishing apparatus 100 presses the polishing target 102 held by the top ring 116 against the polishing pad 108 while the top ring 116 is rotated around a rotational axis which is eccentric from the rotational axis of the polishing table 110. As a result, the polishing target 102 is polished by the polishing pad 108 which holds the polishing slurry, whereby the polishing target 102 is planarized.

A receiver 232 is connected to the eddy current sensor 210 via rotary joint connectors 160 and 170. The receiver 232 receives a signal output from the eddy current sensor 210, and outputs the signal as impedance.

As shown in FIG. 1, a film thickness measuring device 230 performs predetermined signal processing on the impedance output from the receiver 232, and outputs the processed impedance signal to an endpoint detector 240.

The endpoint detector 240 monitors the change of the film thickness of the polishing target 102 based on the signal output from the film thickness measuring device 230. The endpoint detector 240 is connected to the polishing apparatus controller 140 for performing various kinds of control related to the polishing apparatus 100. When detecting a polishing endpoint of the polishing target 102, the endpoint detector 240 outputs a signal representing the detection of the polishing endpoint to the polishing apparatus controller 140. When receiving the signal representing the polishing endpoint from the endpoint detector 240, the polishing apparatus controller 140 causes the polishing apparatus 100 to finish the polishing. The polishing apparatus controller 140 controls the press force being applied to the polishing target 102 based on corrected film thickness data during polishing.

Here, a calibration in this embodiment will be briefly described. When the film thickness is measured by the eddy current sensor 210, it is necessary to determine a correspondence relationship between data obtained from the output of the eddy current sensor 210 and the film thickness in advance. In this embodiment, an angle α is determined from the output of the eddy current sensor 210. Definition of the angle α and how to determine the angle α will be described later.

As described later, 1/tan α calculated from the angle α and the film thickness t are proportional to each other. That is, for 1/tan α=Ta, the relation of the film thickness t=A_th× Ta is satisfied. Here, A_th represents a factor of proportionality. In an actual measurement of the film thickness, Ta can be obtained from a measurement value of the eddy current sensor 210. Accordingly, the factor of proportionality A_th in the correspondence relationship between the output of the eddy current sensor 210 and the film thickness which is represented by "film thickness t=A_th×Ta" may be determined in the calibration. When the factor of proportionality A_th is determined, the film thickness can be calculated by determining the angle α from the output of the eddy current sensor 210 in the actual measurement after the calibration. The measurement value of the eddy current sensor 210 which is obtained from the output of the eddy current sensor 210 means impedance (X,Y) described later, or the angle α described above, tan α, 1/tan α, Ta, etc.

Figure 2:
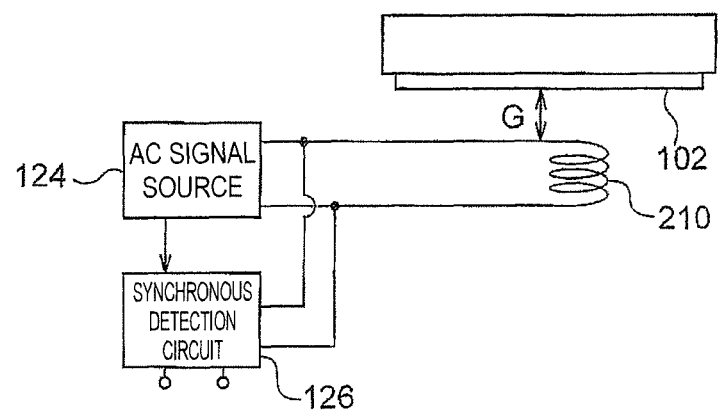
FIG. 2 is a block diagrams showing an exemplified configuration of an eddy current sensor for measuring impedance.

FIG. 2 shows the eddy current sensor 210 equipped with the polishing apparatus 100. In the eddy current sensor, the impedance when viewing a conductive film side from a sensor coil of the eddy current sensor 210 varies, and the film thickness is detected from the variation of the impedance. The eddy current sensor 210 is configured such that the sensor coil is arranged in the neighborhood of the polishing target 102 as a detection target, and an AC signal source 124 is connected to the sensor coil. Here, the polishing target 102 as the detection target is a copper-plated film (may be a deposition film of a metal material such as Au, Cr or W) which is formed, for example, on a semiconductor wafer W and has a thickness of about 0 to 2 μm. The sensor coil is arranged in the neighborhood of the conductive film as the detection target, for example, at a distance of about 0.5 to 5 mm from the conductive film as the detection target. A synchronous detection circuit 126 detects an impedance Z (whose components are X and Y) including the polishing target 102 as the detection target when viewed from the sensor coil side (described in detail later).

Figure 3:
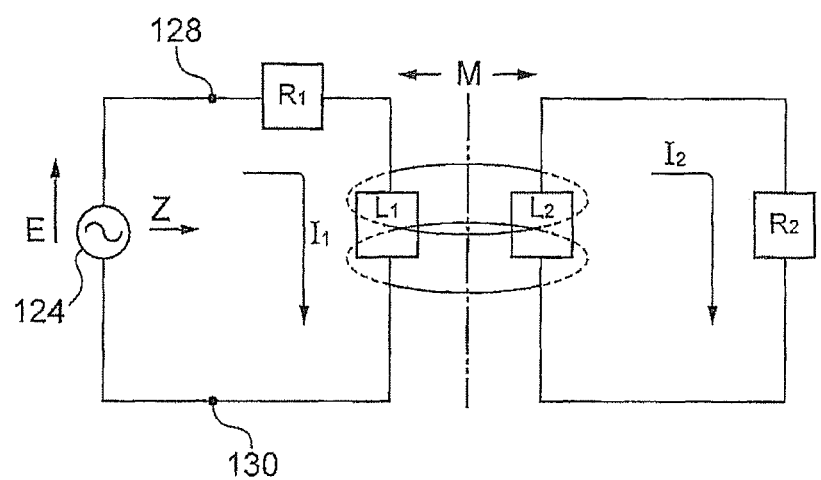
FIG. 3 is an equivalent circuit diagram of the block diagram of FIG. 2.

In an equivalent circuit shown in FIG. 3, the oscillation frequency of the AC signal source 124 is fixed, and when the film thickness of the polishing target 102 changes, the impedance Z when viewing the sensor coil side from the AC signal source 124 varies. That is, in the equivalent circuit shown in FIG. 3, an eddy current $I_2$ flowing in the polishing target 102 is determined by equivalent resistance $R_2$ and self-inductance $L_2$ of the polishing target 102. When the film thickness changes, the eddy current $I_2$ varies, and it is captured as a variation of the impedance Z when viewed from the AC signal source 124 side through mutual inductance M with the sensor coil side. Here, $L_1$ represents a self-inductance component of the sensor coil, and $R_1$ represents a resistance component of the sensor coil.

The eddy current sensor will be specifically described hereunder. The AC signal source 124 is an oscillator having a fixed frequency of about 1 to 50 MHz, and for example, a crystal oscillator is used. Current $I_1$ flows in the sensor coil with an AC voltage supplied from the AC signal source 124. The flow of current in the coil arranged in the neighborhood of the polishing target 102 makes a magnetic flux interlinked across the polishing target 102 to form mutual inductance M therebetween, so that the eddy current $I_2$ flows in the polishing target 102. Here, $R_1$ represents equivalent resistance on the primary side containing the sensor coil, and $L_1$ likewise represents self-inductance on the primary side containing the sensor coil. On the polishing target 102 side, $R_2$ represents the equivalent resistance corresponding to an eddy current loss, and $L_2$ represents the self-inductance of the polishing target 102. The impedance Z when viewing the sensor coil side from terminals 128, 130 of the AC signal source 124 varies depending on the magnitude of the eddy current loss formed in the polishing target 102.

Figure 4:
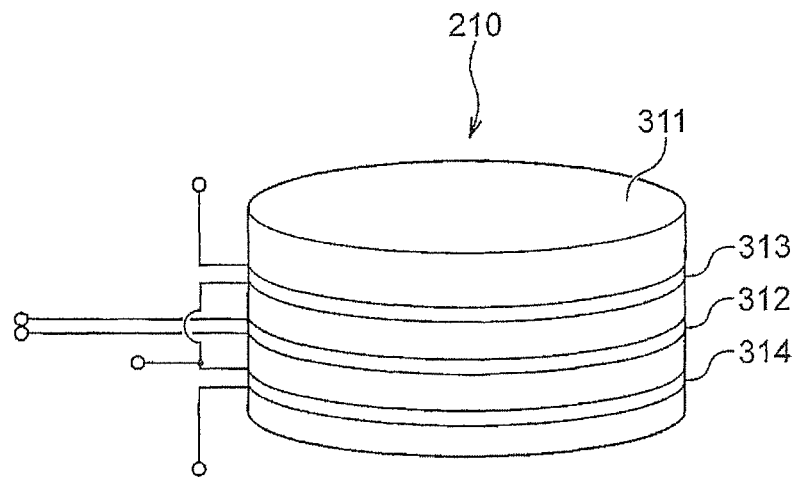
FIG. 4 is a perspective view showing an exemplified configuration of a sensor coil of the eddy current sensor.

FIG. 4 shows an exemplified configuration of the sensor coil in the eddy current sensor according to this embodiment. The sensor coil is configured so that a coil for forming an eddy current in the conductive film and a coil for detecting the eddy current of the conductive film are separated from each other, and comprises three-layer coils wound around a bobbin 311. Here, an exciting coil 312 at the center is an exciting coil connected to the AC signal source 124. The exciting coil 312 forms an eddy current in the polishing target 102 on the semiconductor wafer W arranged in the neighborhood of the exciting coil 312 by magnetic field which is formed by a voltage supplied from the AC signal source 124. A detection coil 313 is arranged on the upper side (the conductive film side) of the bobbin 311, and detects a magnetic field generated by the eddy current formed in the conductive film. A balance coil 314 is arranged on the opposite side to the detection coil 313 of the exciting coil 312.

Figure 5:
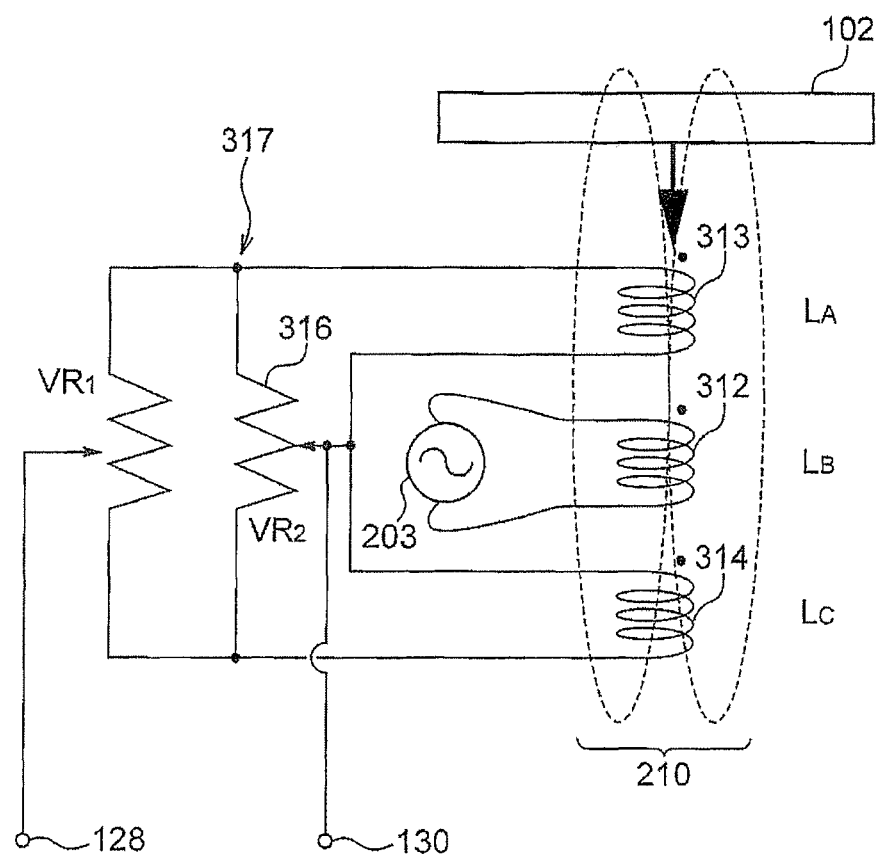
FIG. 5 is a circuit diagram showing a connection example of the sensor coil of FIG. 4.

FIG. 5 shows a connection example of each coil. The detection coil 313 and the balance coil 314 constitute an in-series circuit of opposite phases as described above, and both the ends thereof are connected to a resistance bridge circuit 317 containing a variable resistor 316. The coil 312 is connected to an AC signal source 203, and generates an alternating magnetic flux to form an eddy current in a conductive film 201' arranged in the neighborhood of the coil 312. By adjusting the resistance values of the variable resistors $VR_1$, $Vr_2$, the output voltage of the in-series circuit comprising the coils 313 and 314 is adjustable to be equal to zero when the conductive film is absent.

Figure 6:
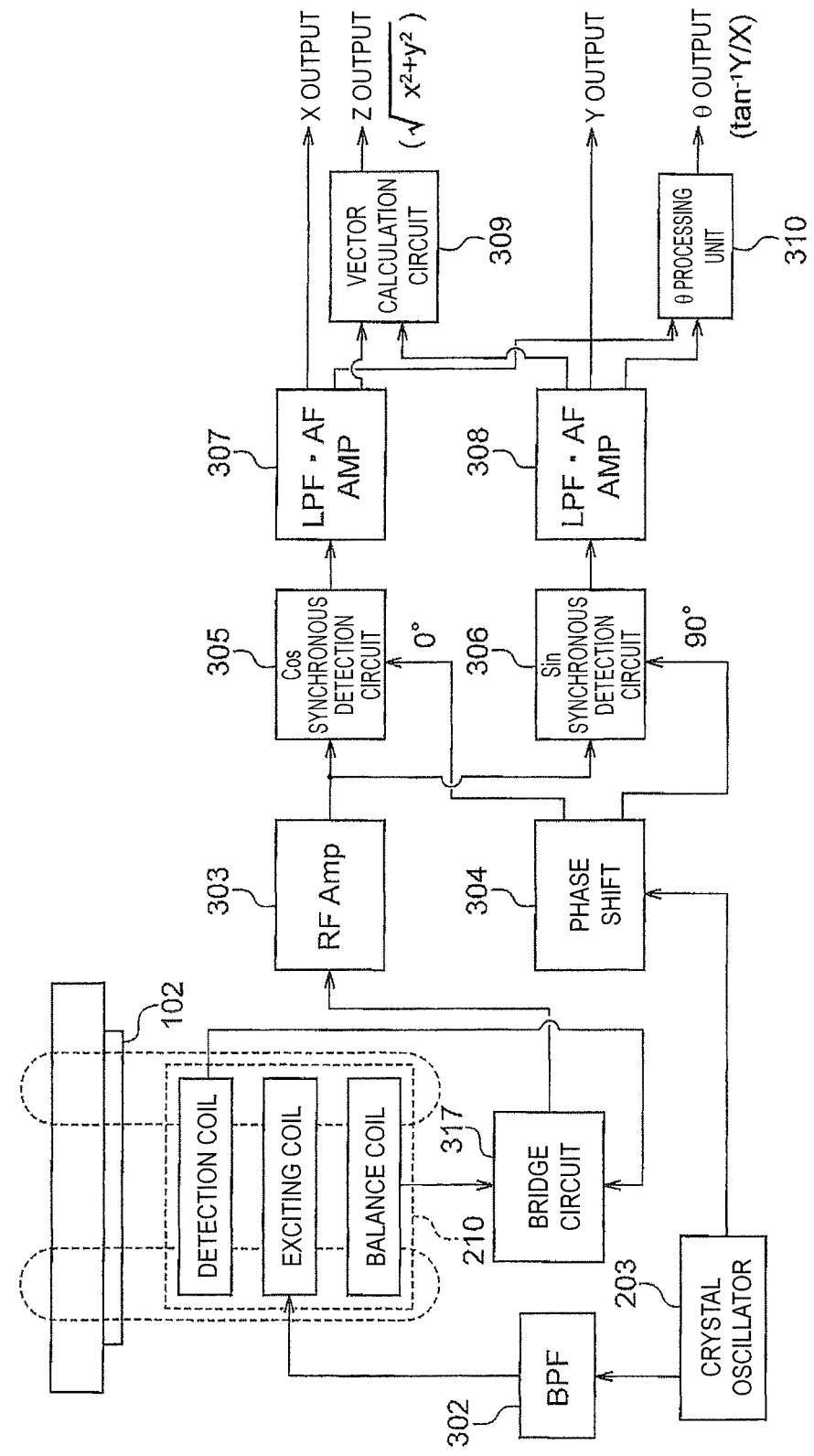
FIG. 6 is a block diagram showing a synchronous detection circuit of a sensor coil output.

FIG. 6 shows an example of a measurement circuit for the impedance Z when viewing the sensor coil 202 side from the AC signal source 203 side. In the measurement circuit for the impedance Z shown in FIG. 6, an impedance plane coordinate value (X,Y) (that is, a resistance component (X), a reactance component (Y)), an impedance (Z=X+iY), and a phase output ($\theta=\tan^{-1}R/X$) which depend on the variation of the film thickness can be taken out. Accordingly, by using these signal outputs, it is possible to detect the progress status of more multifaceted processing, for example, measure the film thickness based on the magnitude of each kind of component of the impedance.

As described above, the signal source 203 for supplying an AC signal to the sensor coil arranged in the neighborhood of the semiconductor wafer W on which the polishing target 102 as the detection target is formed is an oscillator having a fixed frequency comprising a crystal oscillator. The AC signal source 203 supplies a voltage having a fixed frequency of 1 to 50 MHz for example. The AC voltage formed in the signal source 203 is supplied to the exciting coil 312 via a bandpass filter 302. Signals detected at the terminals 128, 130 of the sensor coil are passed through a high-frequency amplifier 303 and a phase shift circuit 304, and then input to a synchronous detector comprising a cos synchronous detection circuit 305 and a sin synchronous detection circuit 306. A cos component (X component) and a sin component (Y component) of the detection signal are taken out by the synchronous detector. Here, two signals of an in-phase component (0°) and an orthogonal component (90°) of the signal source 203 are formed from an oscillation signal formed in the signal source 203 by the phase shift circuit 304. These signals are introduced to the cos synchronous detection circuit 305 and the sin synchronous detection circuit 306 respectively to perform the synchronous detection described above.

Unnecessary components having high frequencies of not less than the frequency of a signal component, for example, high-frequency components of 5 KHz or more are removed from the synchronously detected signal by low pass filters 307 and 308. The synchronously detected signal includes an X component output as a cos synchronous detection output and a Y component output as a sin synchronous detection output. The magnitude of the impedance Z, $(X_2+Y_2)^{1/2}$ is obtained from the X component output and the Y component output by a vector calculation circuit 309. Furthermore, a phase output ($\theta=\tan^{-1}Y/X$) is likewise obtained from the X component output and the Y component output by a vector calculation circuit ($\theta$ processing circuit) 310. Here, these filters are provided to remove noise components of the sensor signal, and cut-off frequencies corresponding to various kinds of filters are set.

Next, points (coordinate values (X,Y)) on the impedance plane coordinate system which correspond to impedances obtained for different distances between the polishing target 102 and the eddy current sensor 210 form different circles. The respective centers of the different circles are located on the same line (second line). A first point is one common point to the different circles. These matters will be described.

The following expressions are satisfied in a sensor side circuit and a conductive film side circuit shown in FIG. 3, respectively:

$$R_1I_1+L_1dI_1/dt+MdI_2/dt=E \quad (1)$$

$$R_2I_2+L_2dI_2/dt+MdI_1/dt=0 \quad (2)$$

Here, M represents the mutual inductance, $R_1$ represents the equivalent resistance of the sensor side circuit, and $L_1$ represents the self-inductance of the sensor side circuit. $R_2$ represents the equivalent resistance of the conductive film in which an eddy current is induced, and $L_2$ represents the self-inductance of the conductive film in which the eddy current flows.

Here, when $I_n = A_n e^{j\omega t}$ (sine wave) is set, the foregoing expressions (1) and (2) are represented as follows:

$$(R_1 + j\omega L_1)I_1 + j\omega M I_2 = E \quad (3)$$

$$(R_2 + j\omega L_2)I_2 + j\omega M I_1 = 0 \quad (4)$$

From these expressions (3) and (4), the following expression (5) is derived.

$$I_1 = E(R_2 + j\omega L_2)/\{(R_1 + j\omega L_1)(R_2 + j\omega L_2) + \omega^2 M^2\} \quad (5)$$
$$= E/\{(R_1 + j\omega L_1) + \omega^2 M^2/(R_2 + j\omega L_2)\}$$

Accordingly, the impedance Z of the sensor side circuit is represented by the following expression (6):

$$Z = E/I_1 = \{R_1 + \omega^2 M^2 R_2/(R_2^2 + \omega^2 L_2^2)\} + j\omega\{L_1 - \omega^2 L_2 M^2/(R_2^2 + \omega^2 L_2^2)\} \quad (6)$$

Here, when the real part of Z (resistance component) and the imaginary part of Z (inductive reactance component) are represented by X and Y, the foregoing expression (6) is represented as follows:

$$Z = X + j\omega Y \quad (7)$$

Here, when $Rx = \omega^2 M^2/(R_2^2 + \omega^2 L_2^2)$ is set, the expression (7) is represented as follows:

$$X + j\omega Y = [R_1 + R_2 R_x] + j\omega[L_1 - L_2 R_x]$$

Accordingly, $X = R_1 + R_2 R_x$, and $Y = \omega[L_1 - L_2 R_x]$ are obtained.

By solving these expressions for $R_2$ and $L_2$, $$R_2 = \omega^2 (X - R_1)M^2/((\omega L_1 - Y)^2 + (X - R_1)^2) \quad (8)$$

$$L_2 = \omega(\omega L_1 - Y)M^2/((\omega L_1 - Y)^2 + (X - R_1)^2) \quad (9)$$

Figure 7:
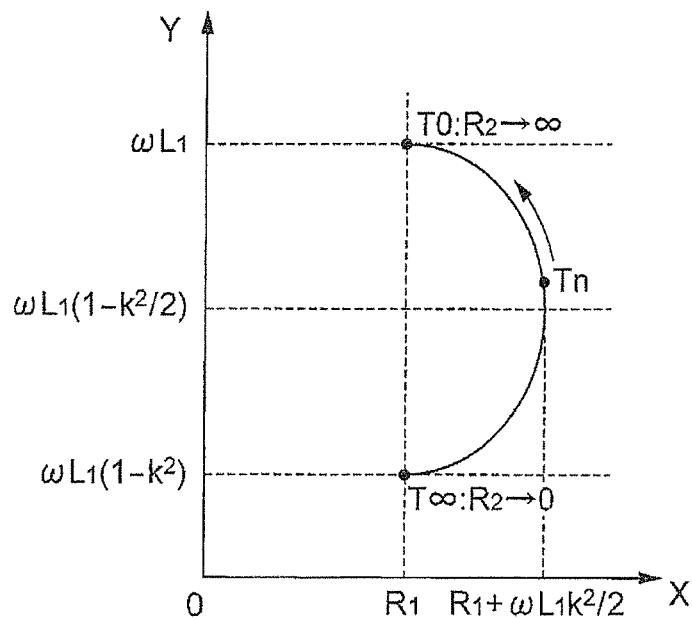
FIG. 7 is a graph showing a circular locus of a resistance component (X) and a reactance component (Y) on an impedance coordinate plane with variation of the thickness of a conductive film.

A symbol k shown in FIG. 7 represents a coupling coefficient, and the following relational expression (10) is satisfied:

$$M = k(L_1 L_2)^{1/2} \quad (10)$$

By applying this expression to (9), $$(X - R_1)^2 + (Y - \omega(1 - (k^2/2))L_1)^2 = (\omega L_1 k^2/2)^2 \quad (11)$$

This expression represents an equation of a circle, and it represents that X and Y form a circle, that is, the impedance Z forms a circle.

The eddy current sensor 210 outputs the resistance component X and the inductive reactance component Y of the impedance of the electrical circuit containing the coils of the eddy current sensor 210. The resistance component X and the inductive reactance component Y are film thickness signals reflecting the film thickness, and vary depending on the thickness of the conductive film on the substrate.

FIG. 7 is a diagram showing a graph which is drawn by plotting X and Y varying together with the film thickness of the conductive film on the XY coordinate system. The coordinates of a point T∞ represent X and Y when the film thickness is infinite, that is, $R_2$ is equal to zero. The coordinate of a point T0 (first point) represents X and Y when the film thickness is equal to zero, that is, $R_2$ is infinite if the conductivity of the substrate is non-negligible. A point Tn (second point) to be positioned from the values of X and Y advances to the point T0 while drawing an arc locus as the thickness of the conductive film decreases.

Figure 8:
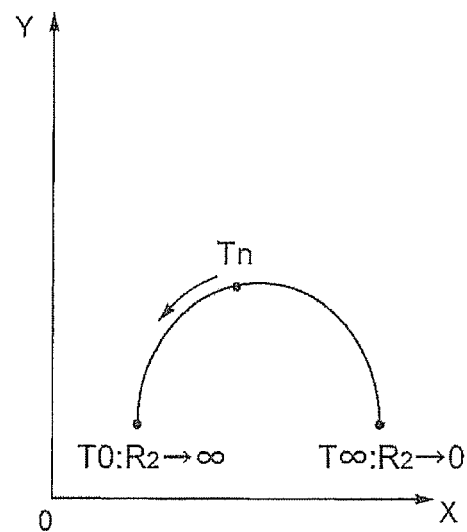
FIG. 8 is a graph obtained by counterclockwise rotating the graph figure of FIG. 7 by 90 degrees and then translating the graph figure.

FIG. 8 is a diagram showing a graph obtained by counterclockwise rotating the graph figure of FIG. 7 by 90 degrees and further translating the graph figure. As shown in FIG. 8, the point Tn to be positioned from the values of X and Y advances to the point T0 while drawing an arc locus as the film thickness decreases. The coupling coefficient k represents a rate at which magnetic field generated by one coil is transmitted to another coil. The maximum value of k is equal to 1, and when the distance between the coils increases, that is, the thickness of the polishing pad 108 increases, k decreases.

Figure 9:
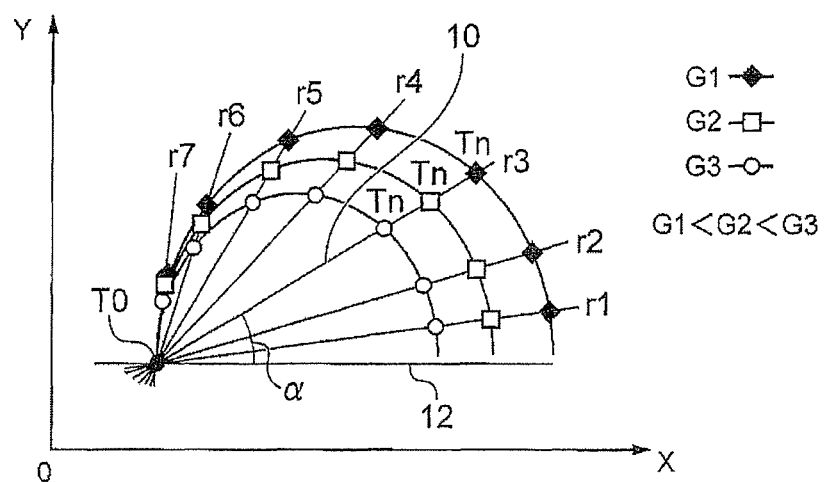
FIG. 9 is a graph showing variation of an arc-shaped locus on the coordinates X, Y according to the distance corresponding to the thickness of a polishing pad being used.

A distance G between the coil of the eddy current sensor 210 and a substrate W changes depending on the thickness of the polishing pad 108 interposed between the coil and the substrate W. As a result, the arc locus of the coordinates X, Y change depending on the distance G (G1 to G3) corresponding to the thickness of the polishing pad 108 to be used as shown in FIG. 9. As is apparent from FIG. 9, the coordinates X, Y for the same film thickness for the distances G1 to G3 are connected to one another by a line (hereinafter referred to as an equal film thickness line (first lines)), and in this case, equal film thickness lines each of which passes through the coordinates X, Y for the same film thickness intersect to one another at an intersection point P irrespective of the distance G between the coil and the polishing target 102. The point P is the first point T0. This equal film thickness line m (n: 1, 2, 3, . . . ) inclines at an angle α corresponding to the thickness of the conductive film (polishing target 102) with respect to the diameter (second line) 12 passing through the first point in FIG. 9. The diameters (second lines) of circles passing through the first point are identical to one another irrespective of the distance G.

The angle α is an intersecting angle at which the first line for connecting the first point (T0) corresponding to the impedance for the film thickness of zero and the second point (Tn) corresponding to the impedance for the non-zero film thickness and the diameter of the circle passing through the first point (T0) intersect to each other. When the thickness of the conductive film is equal, the angle α is equal irrespective of the difference in thickness of the polishing pad 108. This point will be described with reference to FIG. 10.

Figure 10:
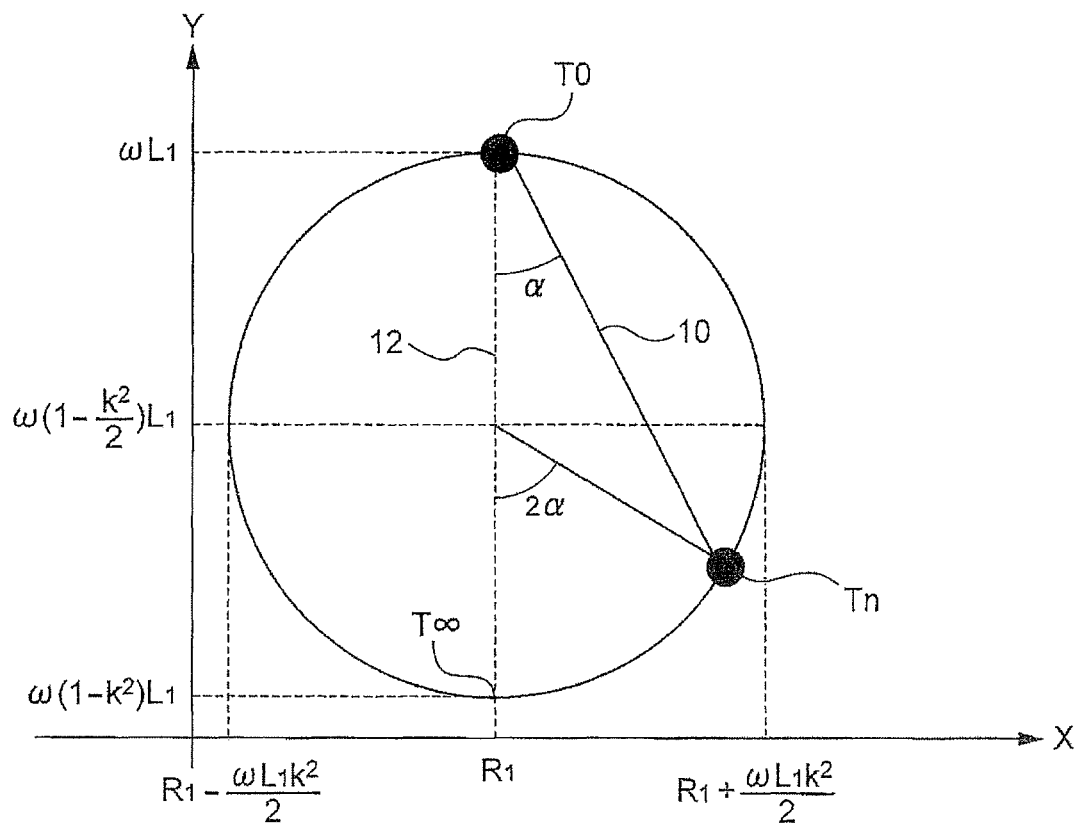
FIG. 10 is a diagram showing that an angle α is identical irrespective of difference of the thickness of a polishing pad 108.

The coordinate (X,Y) of the point Tn is represented by using the angle α shown in FIG. 10. From FIG. 10, $$X = R_1 + \omega(k^2/2)L_1 \sin \alpha \quad (12)$$

$$Y = \omega(1 - (k^2/2))L1 - \omega(k^2/2)L_1 \cos \alpha \quad (13)$$

From (8) and (9) described above, $$R_2/L_2 = \omega(X - R_1)/(\omega L_1 - Y)$$

By substituting (12) and (13) into the above expression, $$R_2/L_2 = \omega \sin 2/\alpha(1 + \cos 2\alpha) = \omega \tan \alpha \quad (14)$$

$R_2/L_2$ is dependent only on the film thickness, and also is not dependent on the coupling coefficient k. Therefore, it is not dependent on the distance between the eddy current sensor 210 and the polishing target 102, that is, the thickness of the polishing pad 108. $R_2/L_2$ is dependent only on the film thickness, and thus the angle α is also dependent only on the film thickness. A film thickness calculator calculates the tangent of the angle α, and determines the film thickness from the tangent by using the relationship of (14).

A method of calculating the angle α and a method of calculating the film thickness will be described. When an eddy current formable in the polishing target 102 is detected as impedance by the eddy current sensor 210 to measure the film thickness of the polishing target, the film thickness measuring device 230 of FIG. 1 receives the impedance from the receiver 232, and determines the film thickness from the received impedance. The film thickness measuring device 230 includes an angle calculator 234 and a film thickness calculator 238.

The angle calculator 234 calculates the angle α at which the first line for connecting the first point T0 corresponding to the impedance for the film thickness of zero and the second point Tn corresponding to the impedance for the non-zero film thickness and a diameter 12 of the circle passing through the first pint T0 intersect to each other. The film thickness calculator 238 calculates the tangent of the angle α, and determines the film thickness from the tangent.

Next, the film thickness calculator 238 for determining the film thickness from the tangent will be described. In this embodiment, the relationship between the reciprocal of the tangent and the film thickness is utilized. First, the relationship between the reciprocal of the tangent and the film thickness will be described.

The relationship of the foregoing (14), that is, the following expression is known between the tangent and the resistance value of the metal film (conductive film).

$$R_2/L_2 = \omega \tan \alpha \quad (14)$$

Here, $R_2$ represents the resistance value of the metal film. Accordingly, $R_2$ and $\tan \alpha$ are proportional to each other. Furthermore, $R_2$ has the following relationship with the film thickness.

$$R_2 = \rho L/tW \quad (15)$$

Here, ρ: resistivity, L, W: the length and width of the metal film, and t: film thickness.

From (14) and (15), it is apparent that the film thickness t and the angle α have the following relationship:

$$R_2 \propto (1/t) \propto \omega \tan \alpha$$

That is, $1/\tan \alpha \propto t$, and thus $1/\tan \alpha$ and the film thickness t are proportional to each other. The method of calculating the film thickness as described above will be described next.

First, the resistance component (X) and the reactance component (Y) on the impedance coordinate plane are obtained by the eddy current sensor 210 and the receiver 232. Next, tan α is calculated by the foregoing method in the angle calculator 234. 1/tan α and the film thickness t are proportional to each other. The film thickness t is determined from 1/tan α based on the proportional connection described later.

Next, a calibration to be performed in advance before the forgoing actual measurement will be described. According to this embodiment, in the calibration of the eddy current sensor 210, when the polishing target 102 is polished while pressed against the surface (polishing face 104) of the polishing pad 108, a correspondence relationship between the film thickness of the polishing target 102 and the measurement value of the eddy current sensor 210 is determined in order to measure the film thickness of the polishing target 102 by the eddy current sensor 210. Here, the correspondence relationship means the proportional connection between 1/tan α and the film thickness t described above.

In the calibration, the output of the eddy current sensor 210 is measured while the polishing target 102 whose film thickness has been known is pressed against the polishing face 104, thereby obtaining the measurement value of the eddy current sensor 210 which corresponds to the film thickness. The film thickness is measured in advance on the outside of the polishing apparatus 100. The measured film thickness is input to the polishing apparatus 100 by user's operation of a terminal, and stored in the film thickness calculator 238.

A wafer whose film thickness has been measured in advance is polished with water while the polishing table 110 is rotated. This will be hereunder referred to as "water polishing". Since water is used in the "water polishing", no polishing occurs actually. The reason why "water polishing" is performed resides in that the purpose of the water polishing is to obtain an output of the eddy current sensor 210 when a polishing target 102 whose film thickness has been known is used, and thus it is undesirable to polish the polishing target 102.

Figure 11:
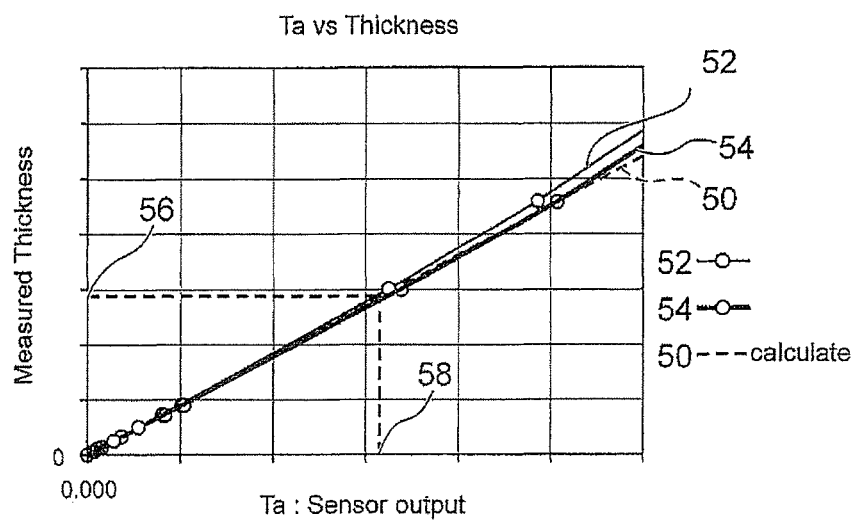
FIG. 11 is a diagram showing a proportional connection between 1/tan α (=Ta) and the film thickness t.

The table rotational number of the polishing table 110 may be arbitrary, but it is desirable to be equal to the rotational number under actual polishing. With respect to the measurement value of the eddy current sensor 210, an average value within a range of 20 mm in diameter from the center of the polishing target 102 is stored in the film thickness calculator 238. The foregoing angle α is obtained from the measurement value of the eddy current sensor 210. A measurement result is shown in FIG. 11. FIG. 11 shows the proportional connection between 1/tan α (=Ta) and the film thickness t. The abscissa axis represents the measurement value 1/tan α of the eddy current sensor 210, and the ordinate axis represents the film thickness t. FIG. 11 shows a measurement value 58 of the eddy current sensor 210 for a known film thickness 56.

Straight lines representing proportional connections shown in FIG. 11 contain a straight line 50 obtained in a calibration stage based on some measurements of the eddy current sensor 210, and a straight line 52 and a straight line 54 which are actually measured by changing the distance between the eddy current sensor 210 and the polishing target 102 in two ways for comparison with the result of the calibration. All of these straight lines satisfy the proportional connection of "film thickness=A_th×Ta". A_th represents the gradient of the straight lines. The purpose of the calibration is to determine the straight line 50. The straight line 50 is a straight line which would be settled when the gradient A_th is known. When the measurement value 58 is known, the gradient A_th is determined because the film thickness 56 has already been known. A method of obtaining the measurement value 58 will be described later.

Furthermore, the film thickness 56 of a wafer used for calibration may have some degree of variation. There is no problem in this embodiment insofar as the film thickness 56 is correctly measured. This is because even when the film thickness 56 is different, a different measurement value 58 is obtained depending on the different film thickness, and the gradient A_th in the relational expression of "film thickness=A_th×Ta" obtained from the film thickness 56 and the measurement value 58 is invariable. In the prior art, since a calibration wafer whose film thickness has been determined is used, the film thickness as a target is fixed in the calibration.

Next, it will be described with reference to FIG. 12 that when the polishing target 102 is polished while pressed against the polishing face 104, the output of the eddy current sensor 210 is measured to obtain measurement values of the eddy current sensor 210 which correspond to the film thickness during polishing. In this step, a straight line representing the diameter of a circle shown in FIG. 10 is determined from the measurement values of the eddy current sensor 210 which correspond to the film thickness during polishing. The angle α corresponding to the measurement value 58 is determined from the obtained straight line and the measurement value of the eddy current sensor 210 measured with reference to FIG. 11, and the measurement value 58 is finally obtained.

In another expression, the following operation is performed in this step. When an eddy current formable in the polishing target is detected as an impedance by the eddy current sensor to measure the film thickness of the polishing target 102, the impedance is input, and the film thickness is determined from the input impedance. When the resistance component and the reactance component of the impedance are associated with the axes of the coordinate system having two orthogonal coordinate axes respectively, points on the coordinate system which correspond to the impedance form at least a part of a circle of FIG. 10. The film thickness measuring device calculates, in the angle calculator, an intersection angle α at which the first straight line 10 connecting the first point T0 corresponding to the impedance when the film thickness is equal to zero and the second point Tn corresponding to the impedance when the film thickness is not equal to zero, and the diameter 12 of the circle passing through the first point intersect to each other, or the tangent tan α of the angle α.

In this step, measurement values of the eddy current sensor 210 are obtained while the polishing target 102 to which the metal film is stuck is polished. A predetermined film of the polishing target 102 is polished until a polishing endpoint. This overall polishing is referred to as "clear polishing". FIG. 12 shows measurement points in the clear polishing. FIG. 12 is similar to FIG. 10. An arc curve 60 represents an area where measurement points used to determine an arc center coordinate 64 exist out of an area where measurement points in the clear polishing exist. In this embodiment, a measurement point 68 represents a measurement value at a polishing start point. The measurement point 68 corresponds to the measurement value 58 shown in FIG. 11. A measurement point 62 represents a measurement value at the end of the polishing. The polishing and measurement for the calibration are performed from the measurement point 68 to the measurement point 62. The arc center coordinate 64 is determined from the arc curve 60 as described above. An arc center straight line 66 is obtained from the measurement point 62 and the arc center coordinate 64.

In this embodiment, as described above, unlike the prior art, the calibration is performed by actually polishing one polishing target 102. In the prior art, no polishing is performed, plural calibration wafers are used and a polishing pad is peeled off From the arc center straight line 66 and the output (existing on the circle) of the eddy current sensor 210 measured with reference to FIG. 11, the angle α corresponding to the output is determined. When the angle α is determined, 1/tan α (=Ta) is determined, that is, the measurement value 58 is determined. The arc center straight line 66 can be represented as Y=A_Imp×X. Here, A_Imp represents the gradient of the arc center straight line 66.

Figure 12:
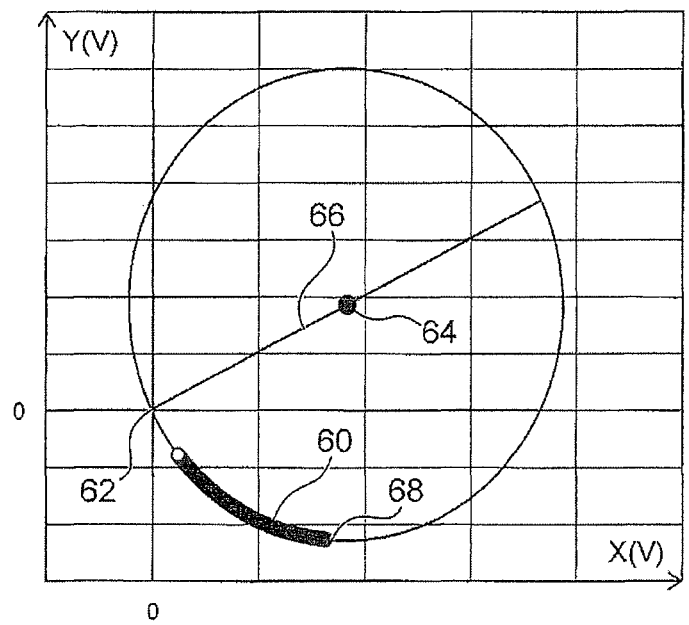
FIG. 12 is a measurement point under clear polishing.

The step shown in FIG. 12 is performed by using the polishing target used in the step shown in FIG. 11. That is, the calibration is performed by polishing one polishing target 102. However, the polishing target used in the step shown in FIG. 11 and the polishing target used in the step shown in FIG. 12 may be different from and independent of each other. That is, the angle α may be calculated by using the output of the eddy current sensor 210 obtained in the step shown in FIG. 11 for a polishing target whose film thickness has been known, and the arc center straight line 66 obtained in the step shown in FIG. 12 for a polishing target which is different from and independent of the former polishing target, and then the measurement value 58 may be calculated.

Next, it will be described with reference with FIGS. 13 and 14 that when the polishing target 102 has a circular shape, the center position of the circular shape is detected. The detection of the center position of the polishing target 102 is not directly related to the determination of the correspondence relationship between the film thickness of the polishing target and the measurement value of the eddy current sensor. However, there is a case where the polishing time, the polishing pressure, etc. are controlled during polishing by mainly detecting the film thickness at the center position of the polishing target 102. Accordingly, it is important to accurately detect the center position of the polishing target 102 in the calibration stage. This detection is performed in the receiver 232.

In this embodiment, the output of the eddy current sensor 210 is measured while the eddy current sensor 210 is moved from one end 76 of the polishing target 102 to another end 78 thereof on the polishing target 102 used in FIGS. 11 and 12.

Figure 14:
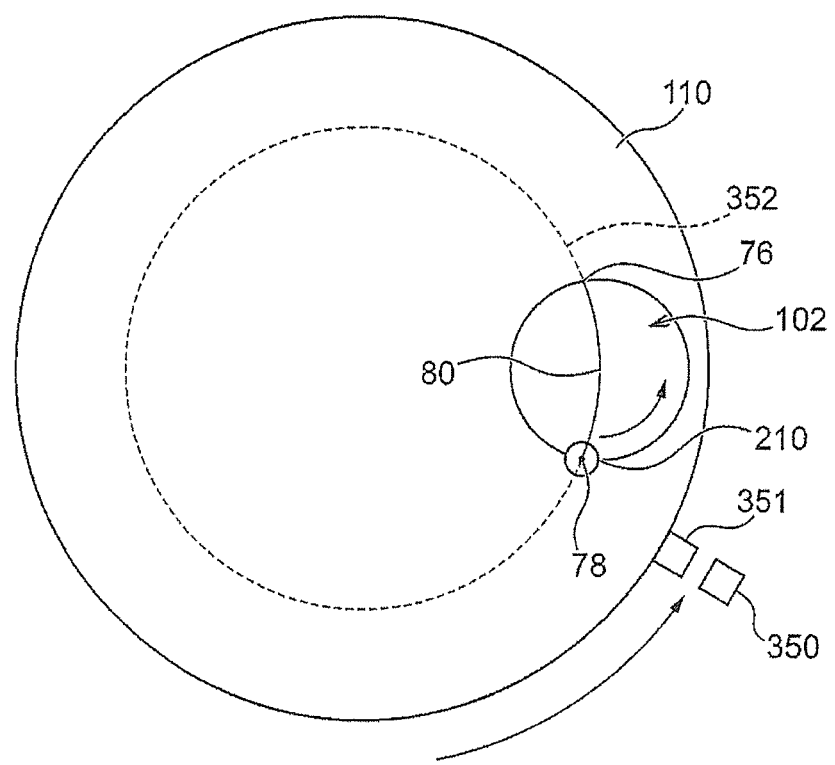
FIG. 14 is a plan view showing a polishing table portion of FIG. 1.

In the rotation of the polishing table 110, a dog 351 fitted to the outer peripheral surface of the polishing table 110 is detected by a dog sensor 350 as shown in FIG. 14. Signal processing of the polishing target 102 held by the top ring 116 is started based on a detection signal from the dog sensor 350. That is, a sensor locus 352 traverses the polishing target 102 with the rotation of the polishing table 110.

The polishing apparatus first receives a signal from the dog sensor 350 while the polishing table 110 makes one revolution. At this time, the polishing target 102 has not yet come onto the eddy current sensor 210, so that the eddy current sensor 210 receives a weak signal outside the polishing target 102. Thereafter, when the eddy current sensor 210 is located below the polishing target 102, the eddy current sensor 210 receives a sensor signal whose level corresponds to an eddy current occurring in the conductive film or the like. After the polishing target 102 has passed over the eddy current sensor 210, the eddy current sensor 210 receives a weak sensor signal outside the polishing target 102 under a state where no eddy current occurs.

Figure 13A:
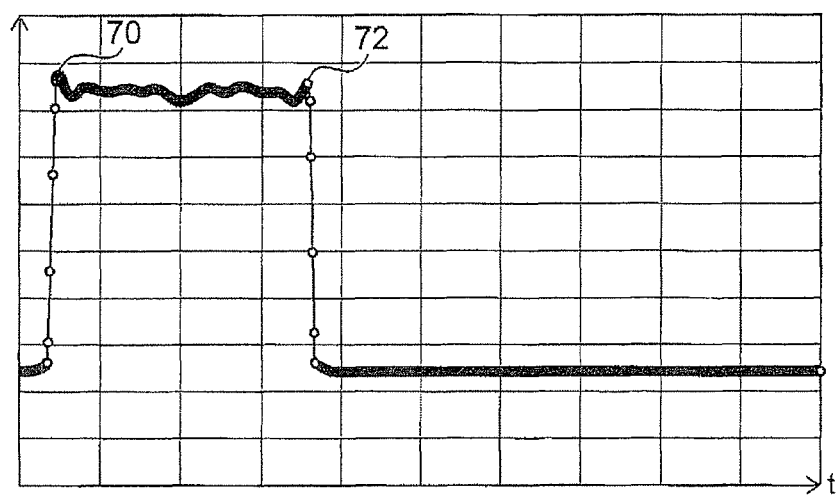
FIG. 13A shows the magnitude of a signal obtained by a measurement.
Figure 13B:
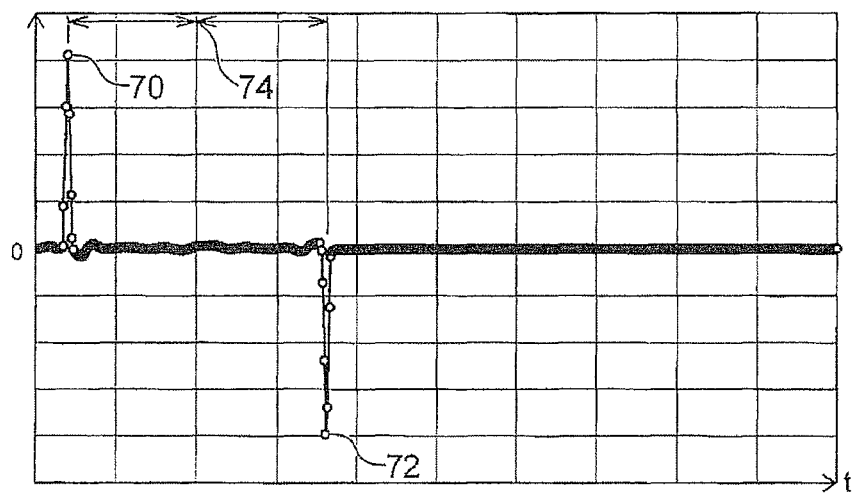
FIG. 13B shows the rate of change (differential or difference) of the signal.

The rate of change (differential or difference) of a measurement value obtained at each point on the polishing target 102 at the point on the polishing target 102 is determined. FIG. 13A shows the magnitude of a signal obtained by the measurement, and FIG. 13B shows the rate of change (differential or difference) of the signal. The abscissa axis represents the time, and the ordinate axis represents the absolute value of the impedance as the output of the eddy current sensor 210 in FIG. 13A, and the time derivative of the absolute value of the impedance in FIG. 13B. The positions of one end 76 (polishing start point 70) and the other end 78 (polishing endpoint 72) of the polishing target 102 can be detected from the rate of change. This is because the rate of change has a plus peak at the polishing start point 70 and has a minus peak at the polishing endpoint 72. From the positions of the one end and the other end at which the peaks of the rate of change are detected, the center position of the polishing target 102 is determined as a middle point 74 between these positions.

The center position of the polishing target 102 can be stored as time information or distance information. In the case of the time information, the center position can be stored as a time from detection of the dog 351. In the case of the distance information, the center position can be stored as a distance from the one end 76 on a route 80.

This step can be performed on any stage in the calibration, but it is preferable that it is performed first in the calibration. With respect to the detection of the center position of the polishing target 102, conventionally, a user views measurement data and visually determines where the center position is located. In this embodiment, the polishing apparatus automatically determines where the center position is located. The table rotational number of the polishing table 110 is arbitrary, but it is preferable that it is set to be equal to that under actual polishing. When this step is performed first in the calibration, the polishing target 102 to which the metal film is stuck is subjected to the water polishing. This is because when the polishing target 102 is polished, it is impossible to perform the measurement shown in FIG. 11.

With respect to the measurement values shown in FIG. 13, the following three conditions are monitored, and an error is determined when at least one of them is not satisfied.

1. In the case of the time value of the plus peak position< the time value of the minus peak position, the polishing target 102 is normal. This is because when this condition is not satisfied, a measurement error may be considered.
2. The distance between the peaks is not more than (the wafer diameter +40 mm) and not less than (the wafer diameter −40 mm). When this condition is not satisfied, it may be considered that a measurement curve or a peak position obtained from the measurement curve is abnormal.
3. There is no peak within 10 mm from the position of the dog 351 which indicates the rotation position of the polishing table 110 provided to the polishing apparatus, that is, the polishing start position. This is because when this condition is not satisfied, it is considered that the position detection of the dog 351 is abnormal, so that abnormality or a measurement error of the dog 351 is considered.

The values used for the determination of these conditions are examples, and other values may be applicable.

Next, it will be described with reference to FIGS. 14 and 15 that the output of the eddy current sensor 210 when the film thickness of the polishing target 102 is equal to 0 angstrom is adjusted to zero. There may be two types of adjustments for the above adjustment. A first type is an adjustment for a case where heat is generated by polishing the polishing target 102 and thus the temperature increases along the route 80 from one end 76 of the polishing target to the other end 78 of the polishing target. The output of the eddy current sensor 210 increases or decreases along the route 80 from the one end 76 to the other end 78. A second type is an adjustment for a case where the output of the eddy current sensor 210 when the film thickness is equal to 0 angstrom is not necessarily equal to zero. The reason why the output of the eddy current sensor is not equal to zero is based on the characteristic of the signal processing circuit of the measuring device for measuring the output of the eddy current sensor 210.

The first adjustment will be described with reference to FIGS. 15A and 15B. This adjustment is performed in the receiver 232. FIG. 15A shows the output of the eddy current sensor 210 when the film thickness of the polishing target 102 is equal to 0 angstrom. In FIGS. 15A, 15B and 15C, the abscissa axis represents the time, and the ordinate axis represents the X or Y component of the impedance.

The eddy current sensor 210 is moved along the route 80 from the one end 76 of the polishing target 102 toward the other end 78 of the polishing target 102 to measure the output of the eddy current sensor at least two points on the route 80. The case where the output of the eddy current sensor is measured at two points is, for example, a case where increase of the temperature is proportional to the distance from the one end 76. At this time, a temperature variation component on the overall route 80 can be determined from the measurement at the two points.

In this embodiment, the measurement is continuously performed on the route 80. A measurement value at a predetermined position on the route 80 is set as a reference value, and information representing the difference between a measurement value at each position on the route 80 and the reference value is obtained. In the case of FIG. 15, the predetermined position is set to the one end 76. The predetermined position may be set to any position on the route 80. The measurement value at the predetermined position on the route 80 and the measurement value at each position on the route 80 are the X or Y component of the impedance in the case of FIG. 15A. The measurement value is not limited to the X or Y component of the impedance, but may be another value described above. The information representing the difference is the difference between X components of the impedance or the difference between Y components of the impedance.

A measurement value 82 represents the level of the measurement value at the one end 76. The difference 88 between a measurement value 86 at some position 84 on the route 80 and the measurement value 82 is shown as an example of the information representing the difference. The difference 88 is considered as a temperature variation component. In this embodiment, the information representing the difference is obtained as the difference 88 itself at each point. When the difference 88 varies linearly, information on the equation of the straight line may be set as the information representing the difference. For example, the gradient of the straight line and the value at some position are set.

The difference between each measurement value obtained in the steps of FIGS. 11 and 12 and the difference 88 at a position on the route 80 which corresponds to each point at which the above measurement value is obtained is calculated based on the information. As a result, the temperature variation component can be removed. FIG. 15B shows a result obtained by removing the temperature variation component from the measurement values of FIG. 15A. In the following description, the processing of removing the temperature variation component will be referred to as "baseline processing". The baseline processing is automatically performed every time the polishing table 110 makes one revolution. Since the purpose of the baseline processing is to detect and remove the temperature variation component, measurement values on the polishing target 102 whose film thickness is not equal to zero may be used.

The second adjustment will be described with reference to FIGS. 15A and 15C. This adjustment is performed in the receiver 232. When the polishing of the polishing target 102 is finished, that is, when the film thickness is equal to zero, the output of the eddy current sensor at at least one point on the route 80 is measured while the eddy current sensor 210 is moved along the route 80 from the one end 76 of the polishing target 102 toward the other end 78 of the polishing target 102. A case where the output of the eddy current sensor 210 at only one point is sufficient is considered to be a case where the same measurement value is obtained at all points on the route 80.

In this embodiment, the measurement is continuously performed on the route 80. Information on the measurement value at each position on the route 80 at the time when the polishing of the polishing target 102 is finished is obtained.

This information is shown in FIG. 15A, and corresponds to the X component or Y component of the impedance.

The difference between a measurement value obtained in the steps of FIGS. 11 and 12 and a measurement value (shown in FIG. 15A) when the polishing is finished at a position on the route 80 which corresponds to each point where the measurement value is obtained is determined based on the above information, whereby the components when the film thickness is equal to zero can be removed. FIG. 15C shows a result obtained by removing the above component from the measurement values of FIG. 15A. In the following description, the processing for removing the component when the film thickness is equal to zero will be referred to as "zero calibration processing". The zero calibration processing is automatically performed every time the polishing table 110 makes one revolution. When the measurement values of FIG. 15A are obtained for the baseline processing and the zero calibration processing, the table rotational number is arbitrary, but it is preferable that the table rotational number is set to be equal to that under actual polishing. In the zero calibration processing, a polishing target 102 to which no metal film is stuck is polished by using slurry. Furthermore, it is preferable that the processing is performed under the same pressure as the actual polishing.

Figure 15:
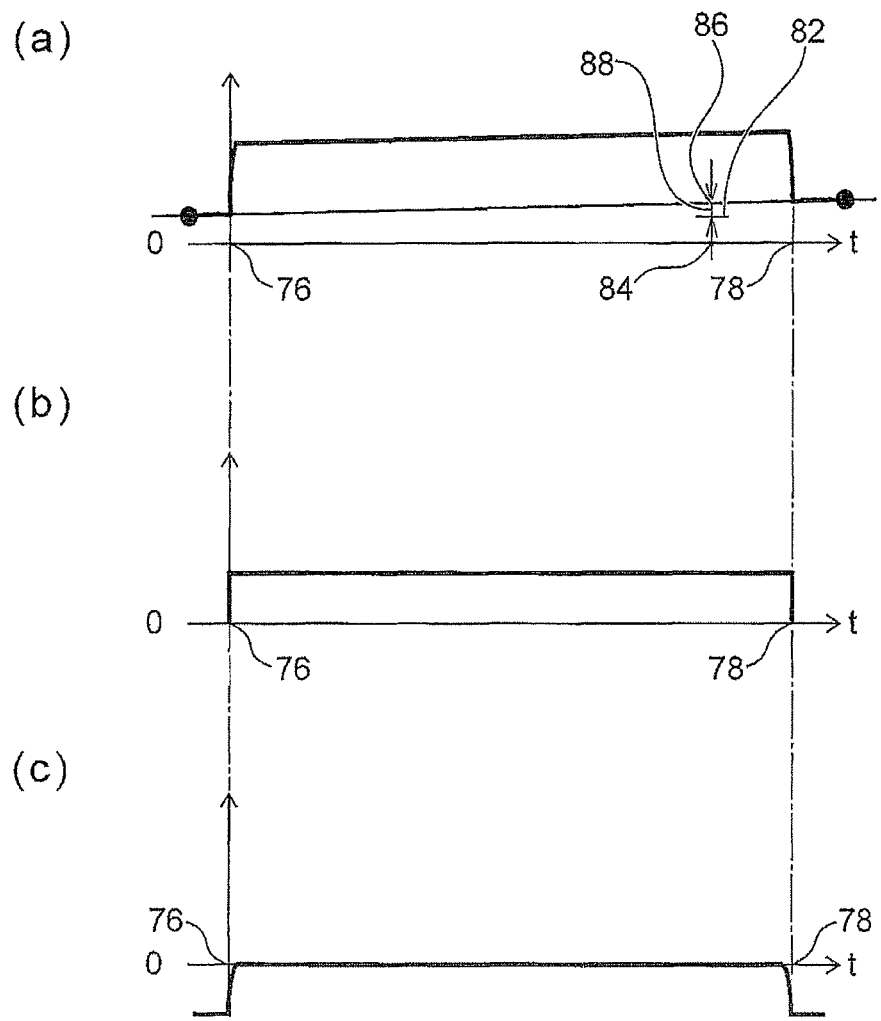
FIG. 15 is a diagram showing baseline processing and zero calibration processing.

Measurement values used in the processing shown in FIGS. 13 to 15 can be measured by using the same one polishing target 102 as the polishing target 102 used in the processing shown in FIGS. 11 and 12. However, without being limited to this style, the measurement values used in the processing shown in FIGS. 13 to 15 may be measured by using a different polishing target 102 from the polishing target 102 used in the processing shown in FIGS. 11 and 12, or measurement values which have already been measured may also be diverted. This is because the measurement values used in the processing shown in FIGS. 13 to 15 are measurement values which are little dependent on the characteristic of the film.

Figure 16:
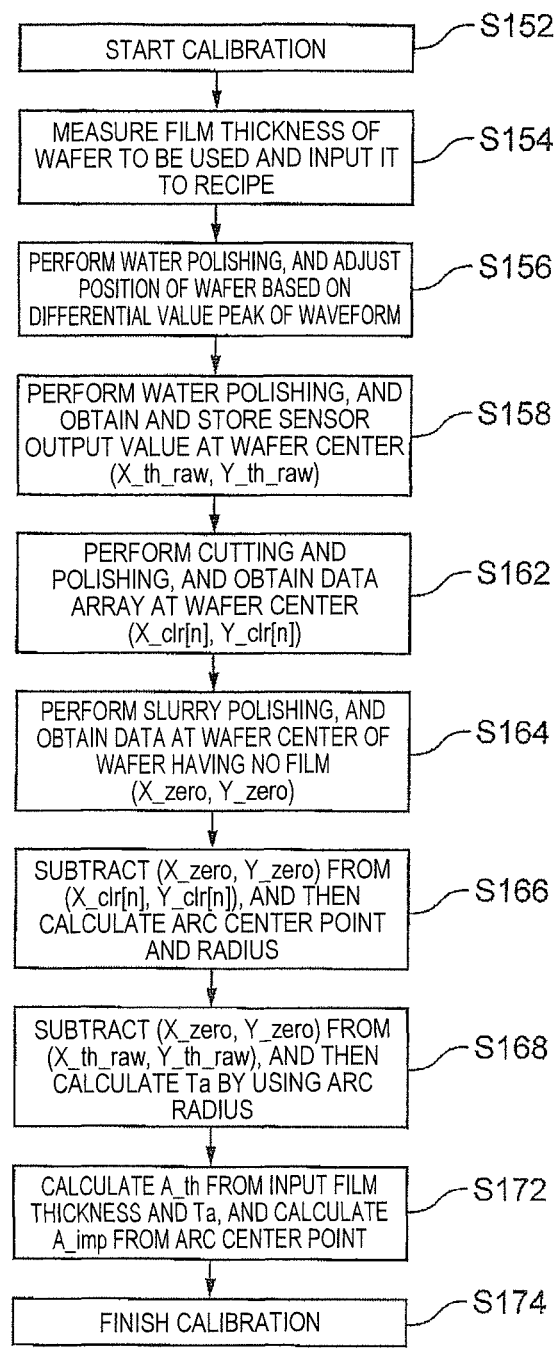
FIG. 16 is a flowchart showing the overall calibration method.

Next, the processing flow for performing the processing shown in FIGS. 11 to 15 by using one polishing target 102 will be described with reference to FIG. 16. FIG. 16 is an entire flow of the calibration.

The flow of the processing of the entire flow is roughly as follows. In the first half of the flow, data necessary for the processing shown in FIGS. 13, 11, 12 and 15 are obtained in this order. After all the data necessary for the processing are measured, the processing shown in FIGS. 12 and 11 is performed in this order in the last half of the flow. At this time, the baseline processing and the zero calibration processing are performed by using the data obtained in the processing (step 164) shown in FIG. 15.

The details of the flow of the processing of the entire flow is as follows. When the calibration is started (step 152), the film thickness of the polishing target 102 used in the calibration is first measured by a film thickness measuring unit provided outside the polishing apparatus. The measured film thickness is input to the controller of the polishing apparatus 100 (step 154).

Next, data necessary for the processing shown in FIG. 13 is obtained (step 156). That is, the water polishing is performed on the polishing target 102, and the center position of the polishing target 10 is detected based on the peaks of the derivatives of a waveform. The data on the position of the polishing target 102 in the controller are adjusted based on the detection result. This step may be omitted. At that time, the center position which was obtained by a past measurement and has already been stored in the polishing apparatus is used. This is because the center position is little changed according to an individual polishing target 102.

Next, data necessary for the processing shown in FIG. 11 are obtained (step 158). That is, the water polishing is performed, and the output value of the eddy current sensor 210 at the center position of the polishing target 102 is obtained and stored. The thus-obtained data is represented by (X_th_raw, Y_th_raw).

Next, data necessary for the processing shown in FIG. 12 is obtained (step 162). That is, polishing is performed with slurry until the film thickness is equal to zero. A data array at the center position of the polishing target 102 is obtained. The thus-obtained data array is represented by (X_clr[n], Y_clr[n]). Here, n represents an identification number of plural data.

Next, data necessary for the processing shown in FIG. 15 is obtained (step 164). That is, polishing for the film thickness of zero is performed. Data at the center position of the polishing target 102 having no film is obtained. The thus-obtained data is represented by (X_zero, Y_zero). This step may be omitted. At that time, data which was obtained by a past measurement and has already been stored in the polishing apparatus is used. This is because the data varies little according to an individual polishing target 102.

The necessary data is obtained as described above, and these data is processed as follows. First, in step 166, (X_zero, Y_zero) is subtracted from (X_clr[n], Y_clr[n]), and then the arc center point and the radius are calculated according to the foregoing method.

Next, in step 168, (X_zero, Y_zero) is subtracted from (X_th_raw, Y_th_raw), and then the measurement value Ta of the eddy current sensor 210 which corresponds to the known film thickness is calculated by using the arc radius.

Next, in step 172, the gradient A_th is calculated from the input known film thickness and Ta obtained in step 168, and the gradient A_imp is calculated from the arc center point. The foregoing processing completes the calibration.

According to this embodiment, the following problems associated with the prior art can be solved. That is, the prior art has the following problems:

1. it is necessary to peel off the polishing pad 108 and perform calibration by using a calibration wafer whose film thickness is known;
2. an error occurs due to a way of manually placing the calibration wafer, contamination of the calibration wafer or the like; and
3. a time-dependent error occurs due to deterioration of the characteristic due to oxidation or the like of the calibration wafer.

According to this embodiment, the problems associated with the prior art can be solved as follows.

1. The calibration can be performed without peeling off the polishing pad.
2. Since the apparatus can be automatically operated, neither positional deviation caused by a manual operation nor an error caused by contamination occurs.
3. Since the calibration can be performed with any polishing target 102 (wafer) whose film thickness has been measured, the calibration is not affected by deterioration of a calibration wafer. Any value is possible as the film thickness. In the prior art, the film thickness is limited to film thicknesses which calibration wafers have. However, according to this embodiment, any value may be used as the film thickness.
4. Since plural calibrations shown in FIGS. 11 to 15 are performed with one polishing target 102, a labor can be saved.

In this embodiment, the plural calibrations shown in FIGS. 11 to 15 are performed with one polishing target 102. However, the processing shown in each of FIGS. 13 and 15 can be performed independently as described above. Data obtained by performing each processing independently can be shared among calibrations on plural different polishing targets 102.

In this case, the processing is performed as follows. In the case of FIG. 13, when the polishing target is polished while pressed against the polishing face, the calibration of the eddy current sensor for determining the center position of the polishing target is executed to measure the film thickness of the polishing target by the eddy current sensor. This method includes the step of measuring the output of the eddy current sensor while the eddy current sensor is moved from one end of the polishing target to another end of the polishing target on the polishing target, and the step of determining the rate of change of the obtained measurement value at each point on the polishing target, detecting the positions of the one end and the other end of the polishing target from the rate of changes, and determining the center position of the polishing target from the detected positions of the one end and the other end.

In the case of the baseline processing shown in FIG. 15B, when the polishing target is polished while pressed against the polishing face, the calibration of the eddy current sensor for determining the variation of the measurement value on a route along which the eddy current sensor is moved from one end of the polishing target to another end of the polishing target is executed to measure the film thickness of the polishing target by the eddy current sensor. This method measures the output of the eddy current sensor at at least two points on a route from one end of the polishing target toward the other end of the polishing target while the polishing target is moved along the route, setting the measurement value at a predetermined position on the route as a reference value, and obtaining information representing the difference between the measurement value and the reference value. The difference between a measurement value obtained by the eddy current sensor in an actual measurement after the above calibration is finished, and a difference at the position on the route which corresponds to each point at which the above measurement is obtained is determined based on the above information.

In the case of the zero calibration processing of FIG. 15C, when the polishing target is polished while pressed against the polishing face, the calibration of the eddy current sensor which takes account of the measurement values of the eddy current sensor under the state that the polishing of the polishing target is finished is executed to measure the film thickness of the polishing target by the eddy current sensor. When the polishing of the polishing target is finished, this method measures the output of the eddy current sensor at at least one point on a route from one end of the polishing target toward another end of the polishing target while the eddy current sensor is moved along the route, and obtains information on the measurement value at each position on the route when the polishing of the polishing target is finished. The difference between a measurement value obtained by the eddy current sensor in an actual measurement after the above calibration is finished, and a measurement value when the polishing of the polishing target is finished, at the position on the route which corresponds to each point at which the above measurement value is obtained is determined based on the above information.

Exemplified embodiments according to the present invention have been described above. However, the foregoing embodiments of the present invention are presented to facilitate understanding of the present invention, and do not limit the present invention. The present invention may be modified or improved without departing from the subject matter of the present invention, and also contains equivalents thereof. The respective constituent elements described in claims and the specification may be arbitrarily combined or omitted to the extent that at least a part of the foregoing problem can be solved or at least a part of the effect can be obtained.

This application claims priority under the Paris Convention to Japanese Patent Application No. 2017-87080 filed on Apr. 26, 2017. The entire disclosure of Japanese Patent Laid-Open No. 2007-263981 including specification, claims, drawings and summary is incorporated herein by reference in its entirety.

REFERENCE SIGNS LIST 70 polishing start point
72 polishing endpoint
74 intermediate point
76 one end
78 another end
80 route
100 polishing apparatus
102 polishing target
104 polishing face
108 polishing pad
110 polishing table
140 polishing apparatus controller
150 polishing unit
210 eddy current sensor
230 film thickness measuring device
232 receiver
234 angle calculator
238 film thickness calculator
240 endpoint detector

What is claimed is:

1. A calibration method for an eddy current sensor for determining a correspondence relationship between a film thickness of a polishing target and a measurement value of the eddy current sensor to measure the film thickness of the polishing target by the eddy current sensor when the polishing target is polished while pressed against a polishing face, comprising:
   a first step of measuring an output of the eddy current sensor while the polishing target whose film thickness has been known is in contact with the polishing face, thereby obtaining a measurement value of the eddy current sensor which corresponds to the film thickness; and
   a second step of measuring an output of the eddy current sensor when the polishing target is polished while pressed against the polishing face, thereby obtaining a measurement value of the eddy current sensor that corresponds to a film thickness during polishing,
   wherein the correspondence relationship between the film thickness of the polishing target and the measurement value of the eddy current sensor is determined from the measurement value obtained in the first step and the measurement value obtained in the second step.

2. The calibration method according to claim 1, wherein the second step is performed by using the polishing target used in the first step.

3. The calibration method according to claim 1, wherein the polishing target used in the first step and the polishing target used in the second step are different from and independent of each other.

4. The calibration method according to claim 1, further comprising
- a step of measuring an output of the eddy current sensor while the eddy current sensor is moved from one end of the polishing target to another end of the polishing target on the polishing target, and
- a step of determining a rate of change of an obtained measurement value at each point on the polishing target, detecting positions of the one end and the other end of the polishing target from the rates of change, and determining a center position of the polishing target from the detected positions of the one end and the other end.

5. The calibration method according to claim 1, further comprising
- a third step of measuring an output of the eddy current sensor at at least two points on a route from one end of the polishing target toward another end of the polishing target while the eddy current sensor is moved along the route, setting the measurement value at a predetermined position on the route as a reference value, and obtaining information on a first difference between the measurement value at each position on the route and the reference value, and
- a fourth step of determining, based on the information, a second difference between the measurement value obtained in the first and second steps and the first difference at a position on the route which corresponds to each point at which the measurement value is obtained.

6. The calibration method according to claim 1, further comprising
- a third step of measuring an output of the eddy current sensor at at least one point on a route from one end of the polishing target toward another end of the polishing target while the eddy current sensor is moved along the route when polishing of the polishing target is finished, and obtaining information on a measurement value at each position on the route when the polishing of the polishing target is finished, and
- a fourth step of determining, based on the information, a difference between the measurement value obtained in the first and second steps and the measurement value when the polishing is finished at a position on the route which corresponds to each point at which the measurement value is obtained.

7. A calibration method for an eddy current sensor for determining a center position of a polishing target to measure a film thickness of the polishing target by the eddy current sensor when the polishing target is polished while pressed against a polishing face, comprising:
- a step of measuring an output of the eddy current sensor when the eddy current sensor is moved from one end of the polishing target to another end thereof on the polishing target; and
- a step of determining a rate of change of an obtained measurement value at each point on the polishing target, detecting positions of the one end and the other end of the polishing target from the rates of change, and determining a center position of the polishing target from the detected positions of the one end and the other end.

8. A calibration method for an eddy current sensor for determining a variation of a measurement value on a route from one end of a polishing target toward another end thereof, the variation occurring when an eddy current sensor is moved along the route, to measure a film thickness of the polishing target by the eddy current sensor when the polishing target is polished while pressed against a polishing face, comprising:
- measuring an output of the eddy current sensor at at least two points on a route from one end of the polishing target toward another end of the polishing target while the eddy current sensor is moved along the route, setting the measurement value at a predetermined position on the route as a reference value, and obtaining information on a first difference between the measurement value at each position on the route and the reference value, and
- determining, based on the information, a second difference between a measurement value obtained by the eddy current sensor in an actual measurement after a calibration is finished, and the first difference at a position on the route which corresponds to each point at which the measurement value is obtained.

9. A calibration method for an eddy current sensor that takes account of a measurement value of the eddy current sensor under a state that polishing of a polishing target is finished in order to measure a film thickness of the polishing target by the eddy current sensor when the polishing target is polished while pressed against the polishing face, comprising:
- measuring an output of the eddy current sensor at at least one point on a route from one end of the polishing target toward another end of the polishing target while the eddy current sensor is moved along the route when the polishing of the polishing target is finished, and obtaining information on the measurement value at each position on the route when the polishing of the polishing target is finished; and
- determining, based on the information, a difference between a measurement value obtained by the eddy current sensor in an actual measurement after a calibration is finished, and the measurement value when the polishing is finished at a position on the route which corresponds to each point at which the measurement value is obtained.

\* \* \* \* \*